(12) United States Patent
Kasai

(10) Patent No.: US 10,243,659 B2
(45) Date of Patent: Mar. 26, 2019

(54) OPTICAL TRANSCEIVER PROVIDING FLEXIBLE PRINTED CIRCUIT BOARD CONNECTING OPTICAL MODULE WITH CIRCUIT BOARD

(71) Applicant: SUMITOMO ELECTRIC DEVICE INNOVATIONS, INC., Yokohama-shi (JP)

(72) Inventor: Shinta Kasai, Yokohama (JP)

(73) Assignee: SUMITOMO ELECTRIC DEVICE INNOVATIONS, INC., Yokohama-shi (JP)

(*) Notice: Subject to any disclaimer, the term of this patent is extended or adjusted under 35 U.S.C. 154(b) by 7 days.

(21) Appl. No.: 15/815,841

(22) Filed: Nov. 17, 2017

(65) Prior Publication Data

US 2018/0145759 A1    May 24, 2018

(30) Foreign Application Priority Data

Nov. 18, 2016 (JP) .................. 2016-225073

(51) Int. Cl.
*H04B 10/00* (2013.01)
*H04B 10/40* (2013.01)

(52) U.S. Cl.
CPC ..................... *H04B 10/40* (2013.01)

(58) Field of Classification Search
CPC .... H04B 10/40; H04B 10/43; H04B 10/2503; G02F 6/4261; G02F 6/4216; G02F 6/4281; G02F 6/4201

USPC ....... 398/135, 136, 137, 138, 139, 158, 159, 398/79, 128, 130, 164; 385/88, 89, 90, 385/92, 93

See application file for complete search history.

(56) References Cited

U.S. PATENT DOCUMENTS

| 9,900,991 B2* | 2/2018 | Kang ..................... H05K 1/189 |
| 2007/0058980 A1* | 3/2007 | Hidaka ................ G02B 6/4201 398/138 |
| 2007/0089900 A1* | 4/2007 | Mitamura .............. H05K 1/028 174/254 |
| 2009/0123116 A1* | 5/2009 | Tanaka ................. G02B 6/4201 385/92 |
| 2012/0097433 A1 | 4/2012 | Kato et al. |

FOREIGN PATENT DOCUMENTS

| JP | 2004-088020 A | 3/2004 |
| JP | 2007-123740 A | 5/2007 |
| JP | 2007-281145 A | 10/2007 |
| JP | 2012-134551 A | 7/2012 |
| JP | 2014-149498 A | 8/2014 |

* cited by examiner

*Primary Examiner* — Hahn Phan
(74) *Attorney, Agent, or Firm* — Venable LLP; Tamatane J. Aga; Laura G. Remus

(57) ABSTRACT

An optical transceiver that provides an optical module, a circuit board, and a housing, where the housing encloses the optical module and the circuit board therein. The optical module provides lead terminals connected with circuits on the circuit board through a flexible printed circuit (FPC) board. The FPC board is bent at a bent portion corresponding to an end of the optical module as the top surface thereof becomes inner. The bent portion of the FPC board provides a bared portion in the back surface thereof, where the bared portion removes a ground pattern.

8 Claims, 4 Drawing Sheets with support member without support member

# OPTICAL TRANSCEIVER PROVIDING FLEXIBLE PRINTED CIRCUIT BOARD CONNECTING OPTICAL MODULE WITH CIRCUIT BOARD

BACKGROUND OF THE INVENTION

1. Field of the Invention

The present invention relates to an optical transceiver, in particular, the invention relates to a flexible printed circuit (FPC) board connecting an optical module with a circuit board each being installed within the optical transceiver.

2. Background Arts

A Japanese Patent Application laid open No. JP-2004-088020A has disclosed an FPC board and an electronic apparatus implementing the FPC board. The FPC board disclosed therein provides a top surface including four signal lines and a ground line and a back surface providing a pair of ground patterns between which a space with no ground patterns is formed. Another Japanese Patent Application laid open No. JP-2007-281145A has disclosed an FPC board including a surface providing lines and another surface opposite to the former surface and providing a pair of shield patterns between which a space with no shield pattern is formed. The FPC board may be bent along the space. Still another Japanese Patent Application laid open No. JP-2012-134551A has disclosed a transmission line formed on an FPC board. The transmission line includes a terminal externally connected, a via, an interconnection, and a connector. The interconnection includes a signal line and a ground where the ground includes via holes arranged in an array along a lateral direction of the FPC board and spaces between the via holes.

A conventional optical module that transmits an optical signal by receiving an electrical through an FPC board and has a co-axial shell often provides a support member between a stem of the optical module and the FPC board in order to prevent breakage of lead terminals extending from the stem of the optical module and fixed with the FPC board when the FPC board is bent adjacent the lead terminals. The support member is attached to the stem so as to fully cover the stem. A transmission line provided on the FPC board has impedance of, for instance, 20 to 30Ω in an optical module within which a semiconductor laser diode (LD) is directly modulated by an electrical signal carried on the transmission line because an LD generally shows relatively lower input impedance.

Recently, as an amount of information to be transmitted in an optical communication system drastically increases, an optical module implemented in the communication system has been also requested to process such a huge amount of the information, namely, an operation speed requested in an optical module has become higher sometimes exceeding 10 GHz or 25 GHz. When an optical module, which has a co-axial shell and is implemented within such optical communication system with a transmission speed exceeding 10 GHz, accompanies with a support member, the support member possibly upsets designed impedance of the signal line and degrades signal shapes. On the other hand, when such an optical module omits a support member, lead terminals possibly break in roots thereof due to stresses caused by bent FPC board. Accordingly, an optical module, or an FPC board, is requested that substantially no stress is affected in the lead terminals even when the optical module accompanies with no support member.

BRIEF DESCRIPTION OF THE DRAWINGS

The foregoing and other purposes, aspects and advantages will be better understood from the following detailed description of a preferred embodiment of the invention with reference to the drawings, in which.

DESCRIPTION OF EMBODIMENT

Next, embodiment according to the present invention will be described as referring to accompanying drawings. In the description of the drawings, numerals or symbols same with or similar to each other will refer to elements same with or similar to each other without duplicating explanations.

Figure 1:
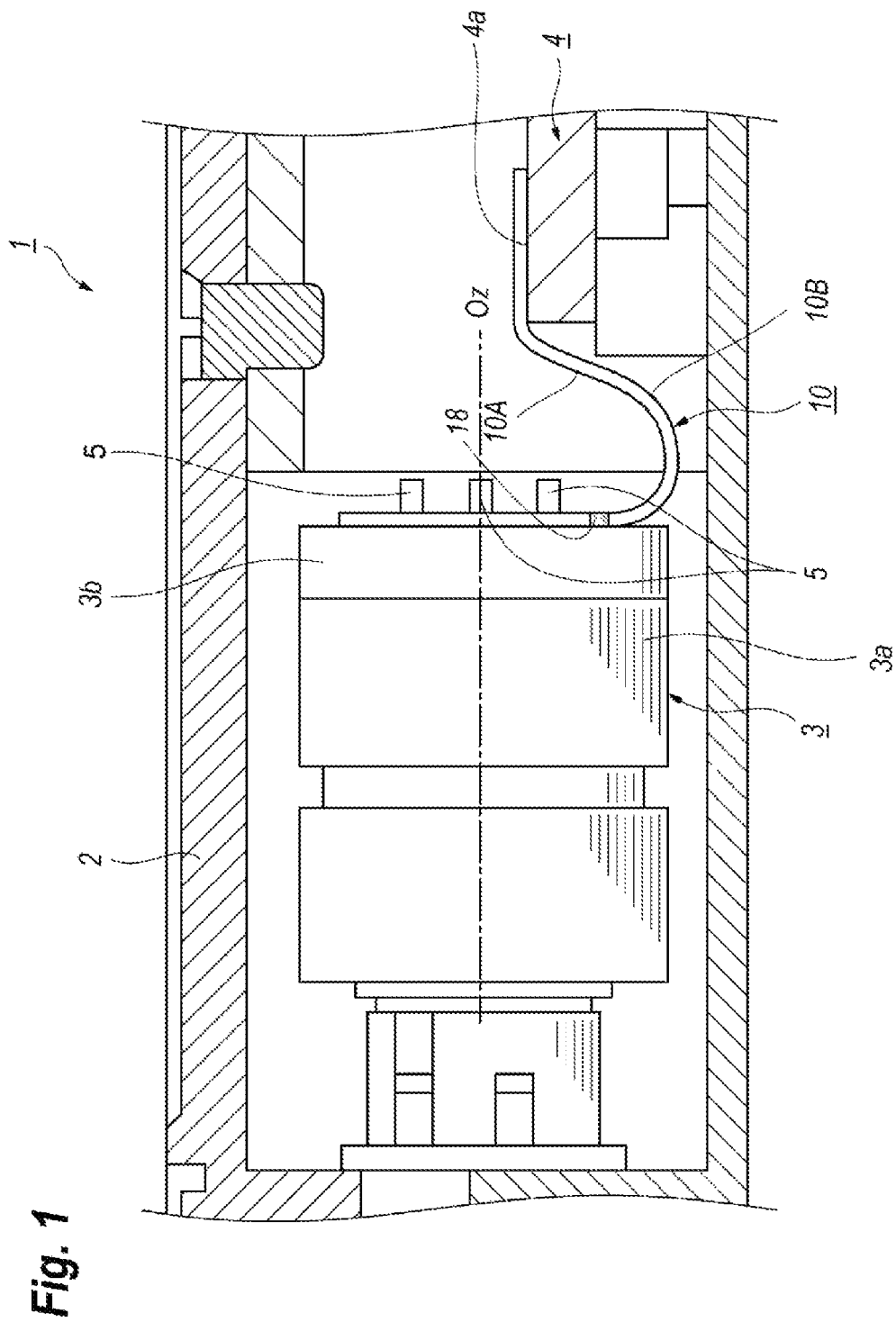
FIG. 1 shows a cross section of an optical transceiver according to embodiment of the present invention.
Figure 2:
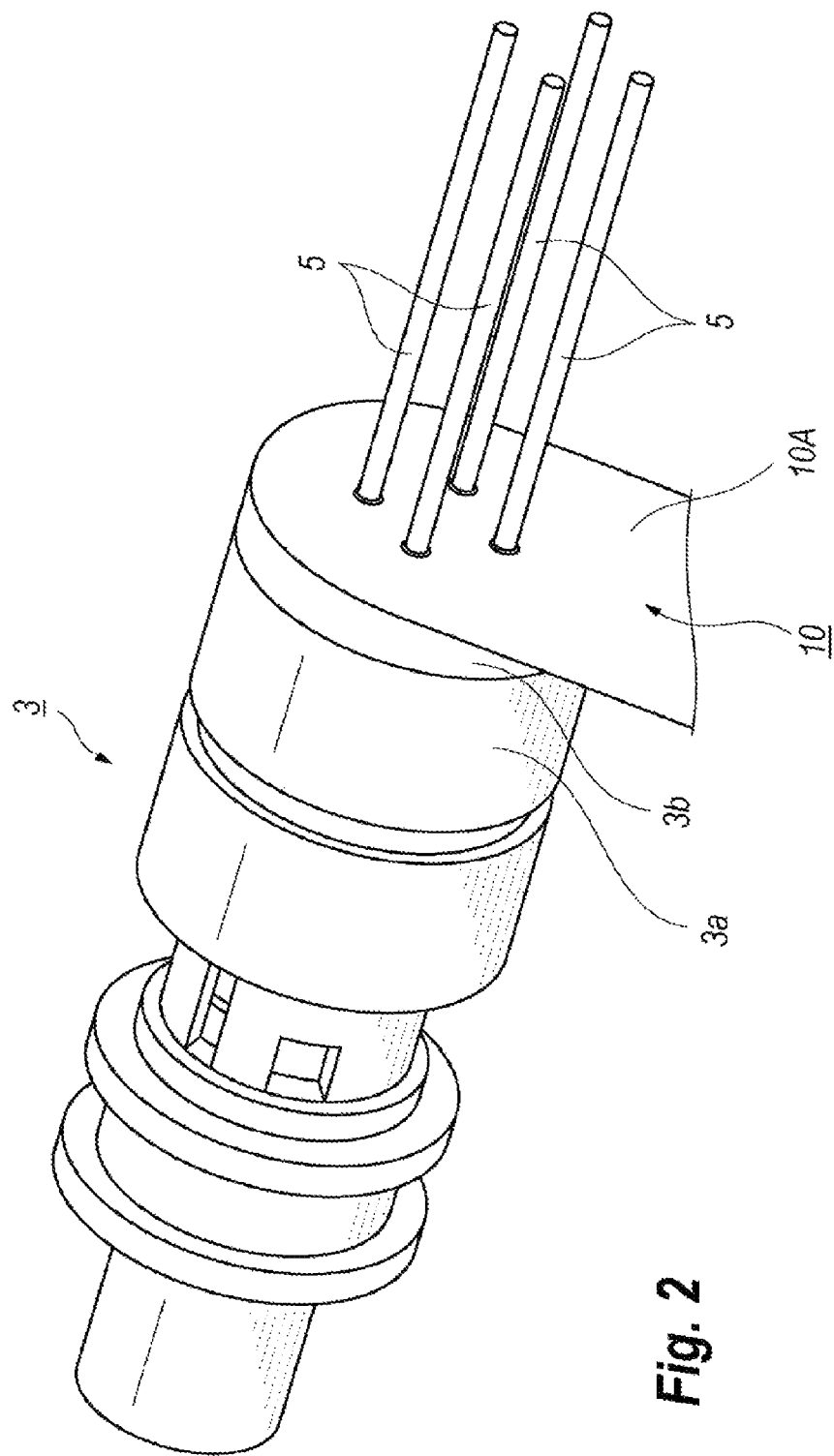
FIG. 2 is a perspective view showing an optical module, lead terminals thereof, and a flexible printed circuit (FPC) board attached to the lead pins.

FIG. 1 shows a cross section of an optical transceiver 1 according to embodiment of the present invention, where the optical transceiver 1 installs an optical module 3 therein, and FIG. 2 is a perspective view of the optical module 3 to which a flexible printed circuit (FPC) board 10 is attached to lead terminals 5 thereof. The optical transceiver 1 satisfies a standard of, for instance, a small form-factor pluggable-28 multi-source agreement (SPF 28 MSA) that realizes an optical communication with a speed of 25 Gbps. The optical transceiver 1, as FIG. 1 illustrates, includes in addition to the optical module 3 and the FPC board 10, a shell 2 and a circuit board 4.

The shell 2 encloses the optical module 3, the FPC board 10, and the circuit board 4 therein. The FPC board 10, which forms a hairpin bent between the optical module 3 and the circuit board 4, electrically connects the optical module 3 with the circuit board 4. Specifically, the FPC board 10 in one end portion is fixed to the stem 3b of the optical module 3, and bent at an end portion of the stem 3b toward the circuit board 4 as a top surface 10A thereof is inner. Then, making the hairpin bent and bent rearward, namely, outward of the hairpin bent as a back surface 10B thereof is inner, and finally, the back surface 10B is fixed to a top surface 4a of the circuit board 4. The circuit board 4 provides the top surface 4a on which circuits for transmitting/receiving signals are mounted. The circuit board 4 is installed within the shell 2 such that the top surface 4a thereof becomes parallel to an optical axis Oz of the optical module 3 extending longitudinal of the optical transceiver 1.

The optical module 3 is a type of, what is called, co-axial transmitter optical sub-assembly (TOSA) that receives an electrical signal from a circuit mounted on the circuit board 4 through the FPC board 10, converts thus received electrical signal into an optical signal, and transmits this optical signal externally. The optical module 3 installs a semiconductor laser diode (LD) within the co-axial shell 3a that provides a stem 3b made of metal in an rear end thereof. The description below assumes that a direction "rear", "back"

and so on corresponds to a side where the circuit board 4 presents, while, another direction "front", "forward", and so on is a side where the optical module 3 exists with respect to the circuit board 4. However, those definitions are only for the explanation sake, and raise no influence of a scope of the invention. The shell 3a further provides lead terminals 5 extending from the stem 3b along the optical axis Oz of the optical module 3.

Figure 3A:
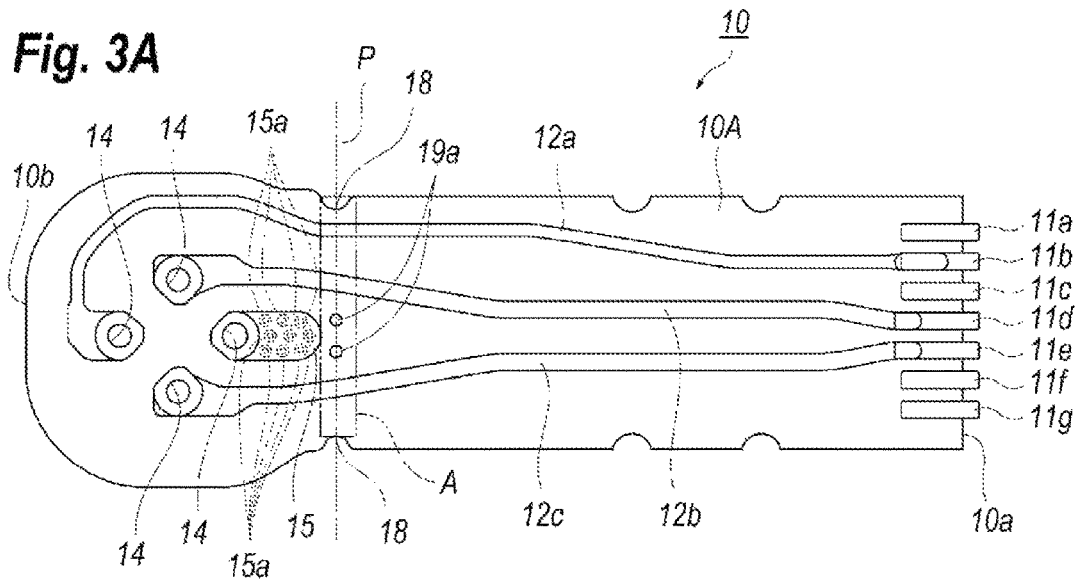
FIG. 3A shows a top surface and FIG. 3B shows a back surface of the FPC board according to the embodiment of the invention.
Figure 3B:
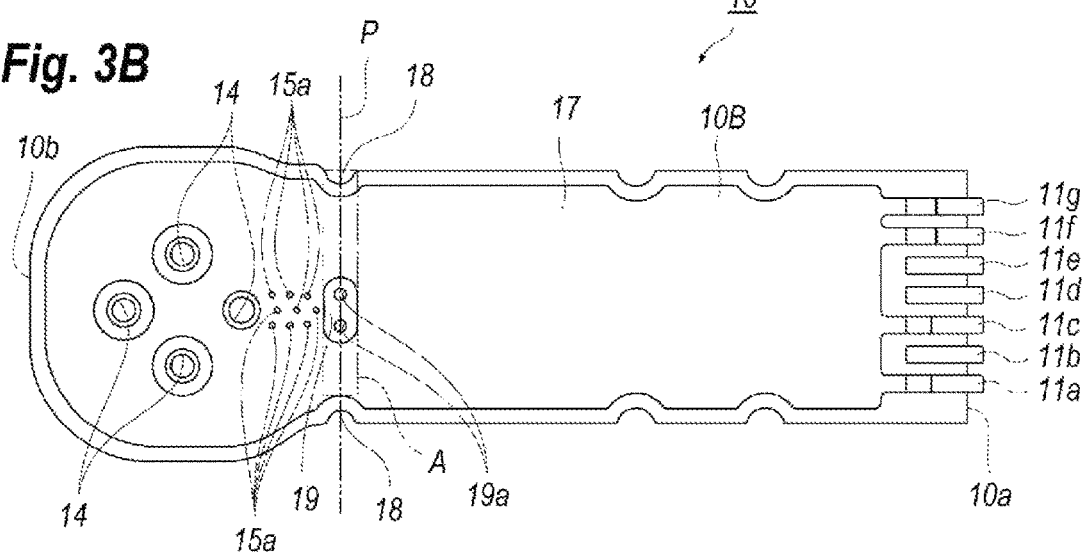

FIG. 3A is a plan view showing a top surface 10A of the FPC board 10, while, FIG. 3B is also a plan view but showing a back surface 10B of the FPC board 10. The FPC board 10 has a slab shape extending along a direction from one end 10a to another end 10b. Specifically, referring to FIG. 1, the FPC board 10 is connected to the stem 3b in the one side 10b and the circuit board 4 in the other side 10a as forming the hairpin bent with the top surface 10A to be inner.

The top surface 10A of the FPC board 10 provides pads, 11a to 11g, in the one side 10a, a signal line 12a, and two bias lines, 12b and 12c, each extending from the pads, 11b, 11d, and 11e. The signal line 12a carries the electrical signal provided to the LD installed in the optical module 3, where the electrical signal has a speed of, for instance, 25 Gbps. While, the bias lines, 12b and 12c, carry biases of direct current (DC) signals. The signal line 12a may be matched in impedance thereof. Accordingly, the signal line 12a has a width narrower than that of the bias lines, 12b and 12c.

The top surface 10A of the FPC board 10 may further include lands 14 and a ground pattern 15 in the other side 10b opposite to the side 10a where the pads, 11a to 11g, are provided. The lands 14 that have a doughnut shape receive the lead terminals 5 therein. The back surface 10B of the FPC board 10 provides pads, 11a to 11g, and a ground pattern 17 that is connected with some of the pads, 11a, 11c, 11f, and 11g. These pads, 11a to 11g, in the back surface 10B are soldered with terminals provided on the top surface 4a of the circuit board 4.

The FPC board 10 may further provides a pair of cuts 18 in respective sides thereof between the ground pattern 15 and the pads, 11a to 11g, on the top surface 10A. The cuts 18 may form a virtual line P that corresponds to an end portion of the stem 3b and the FPC board 10 is going to be bent along the line P. Also, the FPC board 10 in the back surface 10B thereof may provide a bared pattern 19 on a virtual line P connecting the cuts 18, where the bared pattern 19 removes the ground pattern 17 to expose a bare surface of the FPC board 10. A portion where the virtual line P connecting the cuts 18 and the bared pattern 19 exist is an area A to be easily bent thereat compared with other portions on the FPC board 10 because of the existence of the cuts 18 and the bared pattern 19 without the ground pattern 17. The bared pattern 19 has an extended ellipsoid along the virtual line P and provides a pair of via holes 19a piercing the FPC board 10 and disposed laterally in side by side. The via holes 19a, which is not filled with metal, may further facilitate for the FPC board 10 to be bent thereat.

The ground pattern 15 on the top surface 10A is provided in a side closer to the lands 14 for the lead terminals 5 with respect to the area A. The ground pattern 15 has a substantial width and a metal film thereon. Accordingly, even when the FPC board 10 is going to be bent at a portion offset from the area A, the ground pattern 15 may prevent the FPC board 10 from being bent at a portion closer to the lands 14. That is, the FPC board 10 is likely bent at a portion opposite to the ground pattern 15 with respect to the area A, namely, closer to the pads, 11a to 11g. The ground pattern 15 also provides via holes 15a that fully pierce the FPC board 10. The via holes 15a are filled with metal, which makes the ground pattern 15 further rigid, and prevents the FPC board 10 from being bent offset from the virtual line P toward the ground pattern 15.

Conventionally, the stem of the optical module often provides a support member in order to release stresses affected in the lead terminals as the FPC board is bent. However, the support member may disarrange the impedance of the lead terminals and that of the transmission line of the FPC board, which degrades the signal shape. Without any support member, stresses caused by the bent FPC board concentrate on roots of the lead terminals, which possibly break the lead terminals.

The optical module of the present embodiment, the FPC board 10 without accompanying with no support member provides the bared portion 19 in the back surface 10B where the ground pattern 17 is removed to expose the bare surface of the FPC board 10, and in addition, the top surface 10A thereof provides the ground pattern 15 with a plurality via holes 15a filled with metal in an area closer to the bent portion A. Thus, providing the bared portion 19 in the area A to be bent and the ground pattern 15 neighbor to the area A, the FPC board 10 becomes actively bent at the area A. Thus, the lead terminals 5 in the roots thereof may be released from the stresses without degrading the signal shape.

Figure 4A:
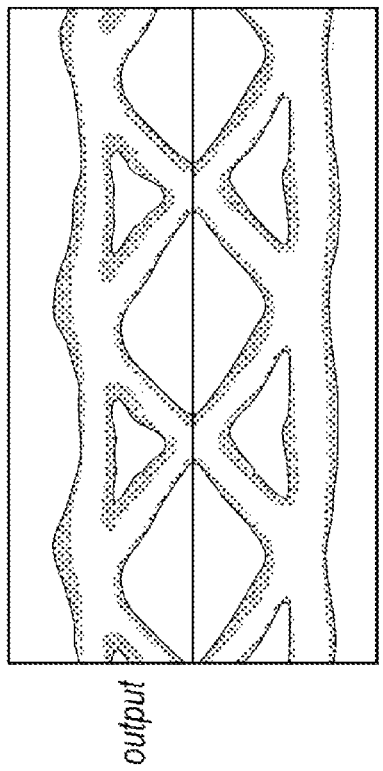
FIGS. 4A and 4B compares signal qualities between a convention optical module with a support member, FIG. 4A, and an optical module of the present embodiment without any support member, FIG. 4B.
Figure 4B:
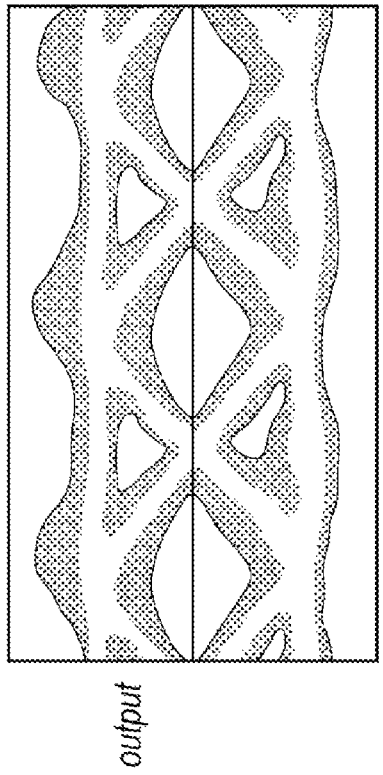

FIGS. 4A and 4B compares the signal shapes output from optical modules when the stem accompanies with a support member, FIG. 4A, and without any support member, FIG. 4B. A conventional optical module shows instable high and low levels and scattered jitters, as shown in FIG. 4A. On the other hand, the optical module of the present embodiment may show stable levels and a shrunk jitter.

While particular embodiment of the present invention has been described herein for purposes of illustration, many modifications and changes will become apparent to those skilled in the art. Accordingly, the appended claims are intended to encompass all such modifications and changes as fall within the true spirit and scope of this invention.

The present application claims the benefit of priority of Japanese Patent Application No. 2016-225073, filed on Nov. 18, 2016, which is incorporated herein by reference.

What is claimed is:

1. An optical transceiver, comprising:
   an optical module that provides a co-axial shell having an optical axis and lead terminals extending from the co-axial shell along the optical axis;
   a circuit board that mounts circuits communicating with the optical module; and
   a flexible printed circuit (FPC) board that electrically connects the lead terminals of the optical module with the circuits on the circuit board, the FPC board providing a top surface including a signal line and a back surface including a ground pattern, the FPC board having a bent portion along which the FPC board is bent as the top surface thereof becomes inner, the bent portion corresponding to an end of the co-axial shell of the optical module,
   wherein the FPC board further provides a bared portion at the bent portion in the back surface thereof, the bared portion removing the ground pattern therefrom.

2. The optical transceiver according to claim 1,
   wherein the FPC board includes lands that are connected with the lead terminals of the optical modules and another ground pattern between the bent portion and the lands in the top surface thereof, and
   wherein the another ground pattern in the top surface of the FPC board is extended from one of the lands.

3. The optical transceiver according to claim 2,
wherein the another ground pattern in the top surface of the FPC board is connected with the ground pattern in the back surface of the FPC board through a plurality of vias.

4. The optical transceiver according to claim 3,
wherein the vias are filled with metals.

5. The optical transceiver according to claim 1,
wherein the FPC board further provides a via in the bared portion thereof, the via being filled with no metal.

6. The optical transceiver according to claim 1,
wherein the bared portion has a shape of an extended ellipsoid extending along the bent portion.

7. The optical transceiver according to claim 1,
wherein the FPC board further provides a pair of cuts in respective sides of the bent portion.

8. The optical transceiver according to claim 1,
wherein the FPC board provides a hairpin bent between the optical module and the circuit board, the top surface of the FPC board being inner at the hairpin bent.

* * * * *